United States Patent [19]

Stiles et al.

[11] 4,323,482
[45] Apr. 6, 1982

[54] CATALYST AND METHOD OF PREPARATION

[75] Inventors: Alvin B. Stiles, Wilmington, Del.; Glenn L. Schrader, Jr., Ames, Iowa

[73] Assignee: University of Delaware, Newark, Del.

[21] Appl. No.: 228,591

[22] Filed: Jan. 26, 1981

Related U.S. Application Data

[63] Continuation-in-part of Ser. No. 66,433, Aug. 14, 1979, abandoned.

[51] Int. Cl.³ .................. B01J 21/04; B01J 23/10; B01J 23/78; B01J 23/86
[52] U.S. Cl. .................. 252/462; 252/432; 252/454; 252/461; 252/463; 252/465; 252/466 J; 252/467; 252/468; 252/469; 252/470; 252/471; 252/472; 252/473; 252/475; 252/476
[58] Field of Search .............. 252/462, 465, 466 J, 252/468, 470, 473, 461, 469, 471, 472, 475, 476, 432, 454, 463, 467; 518/714, 715

[56] References Cited

U.S. PATENT DOCUMENTS

| | | | |
|---|---|---|---|
| 3,216,954 | 11/1965 | Howk et al. | 252/465 |
| 3,897,367 | 7/1975 | Lauder | 252/462 |
| 4,000,987 | 1/1977 | Okagami et al. | 252/465 X |
| 4,022,870 | 5/1977 | Palilla et al. | 252/462 X |
| 4,049,583 | 9/1977 | Lauder | 252/466 PT |
| 4,107,091 | 8/1978 | Khera | 252/466 J |

FOREIGN PATENT DOCUMENTS 1056685 1/1967 United Kingdom ............... 252/462

*Primary Examiner*—W. J. Shine

[57] ABSTRACT

A catalyst for the manufacture of organic compounds comprising an intimate mixture of a reducible metal oxide and at least one refractory oxide, treated by heating to a temperature in the range of 550° C. to 1000° C. in the presence of a preselected reducing gas in amount sufficient to substantially inhibit or disrupt crystallite growth as evidenced by characteristic x-ray diffraction pattern, concomitantly enhancing catalytic activity, and the method of preparation.

8 Claims, 6 Drawing Figures

CATALYST AND METHOD OF PREPARATION

BACKGROUND OF THE INVENTION

This application is a continuation-in-part of Application Ser. No. 06/066,433, filed Aug. 14, 1979, now abandoned.

It has been broadly accepted in the prior art that exposure of metal oxide catalysts to high temperatures has resulted in crystallite growth, which reduces catalytic activity.

Thus, U.S. Pat. No. 3,216,954 issued on Nov. 9, 1965, to Howk and Stiles reports increase in crystallite size of spinels when heated at 400° C., 600° C., and 800° C., respectively, from poorly developed crystallinity at 400° C. to extremely large crystallite size (ca 500 Å) at 800° C.

Lauder U.S. Pat. No. 3,897,367 discloses catalysts prepared at elevated temperatures which develop the perovskite structure and, in his subsequent U.S. Pat. No. 4,049,583, it is taught that exposure to elevated temperatures produces identifiable crystal phases while retaining the perovskite structure.

Also, British Pat. No. 1,513,291, inventor Stiles, teaches the preparation of a methanation catalyst quite similar to one described infra, wherein precautions were advised against exposure to reducing atmospheres, which was found to increase crystallite growth.

We have now devised catalyst compositions which not only withstand exposure to high temperatures and reducing atmospheres without objectionable crystal growth but, surprisingly, are positively benefited in catalytic activity by a heating, reducing atmosphere combined treatment under controlled conditions hereinafter described.

SUMMARY OF THE INVENTION

This invention constitutes a catalyst composition comprising an intimate mixture of at least two metal oxides one of which is reducible to either a sub-oxide or substantially to the elemental metal state whereas the other is a refractory oxide which is substantially non-reducible, which mixture has been exposed to a reducing gas in sufficient quantity and at a temperature in the range of 550° C. to 1000° C. to cause a substantial inhibition or disruption of crystallite growth as evidenced by x-ray diffraction pattern analysis, concomitantly enhancing catalytic activity, and the method of catalyst preparation.

THE DRAWINGS

The following drawings constituting part of this disclosure are partially schematic artist's representations of characteristic x-ray diffraction patterns illustrating the complete range of crystallites which metal oxide catalysts have been found to display as a result of exposure to temperatures in the range of 400° C. to 800° C., with and without concomitant exposure to reducing atmospheres, in which.

DETAILED DESCRIPTION

Figure 1:
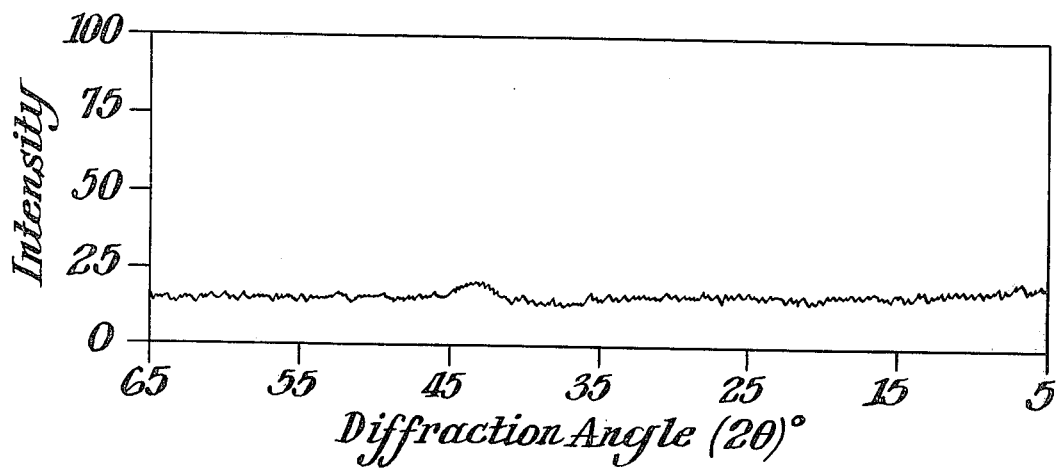
FIG. 1 represents a diffuse pattern, revealing little or no crystallinity.
Figure 2:
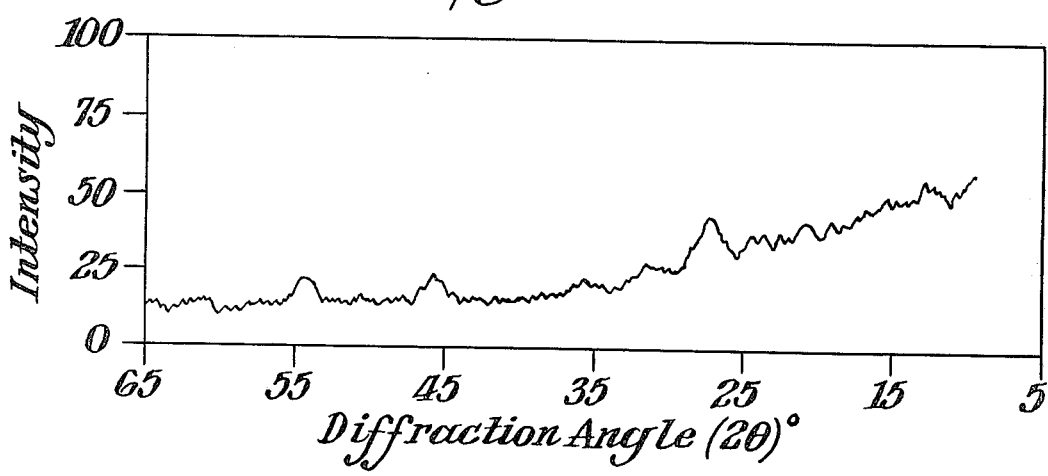
FIG. 2 represents a condition of incipient crystallization wherein there is very little crystallinity development.
Figure 3:
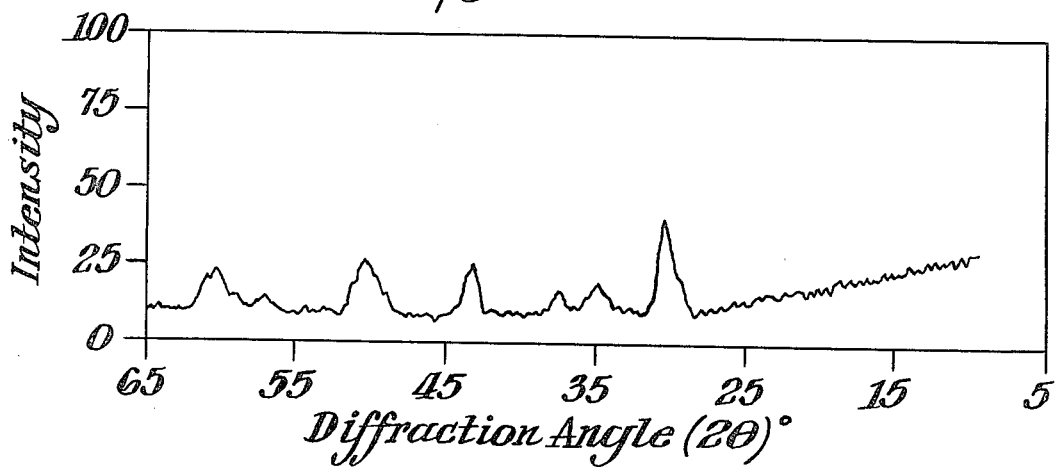
FIG. 3 represents moderate crystallinity wherein there exists some identifiable peaks.
Figure 4:
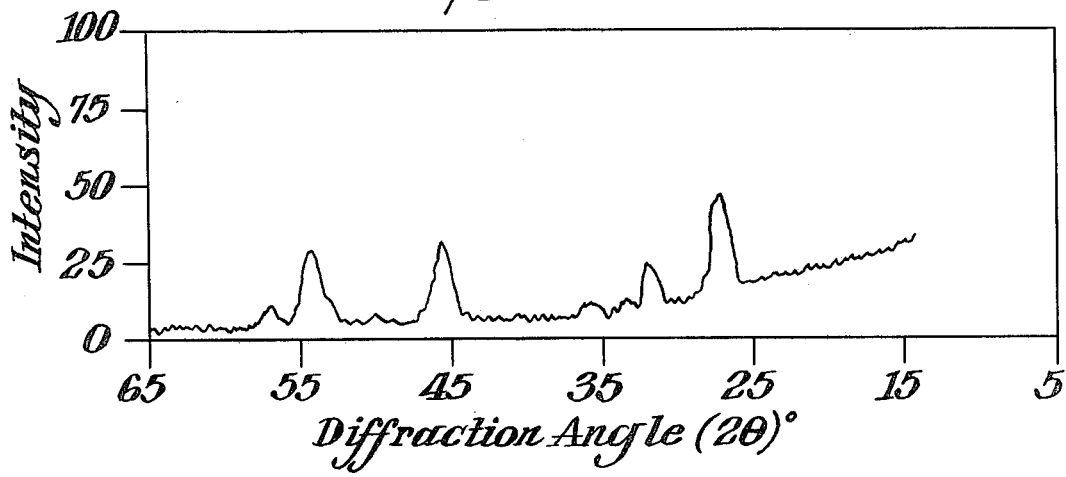
FIG. 4 represents well-developed short peak crystallinity.
Figure 5:
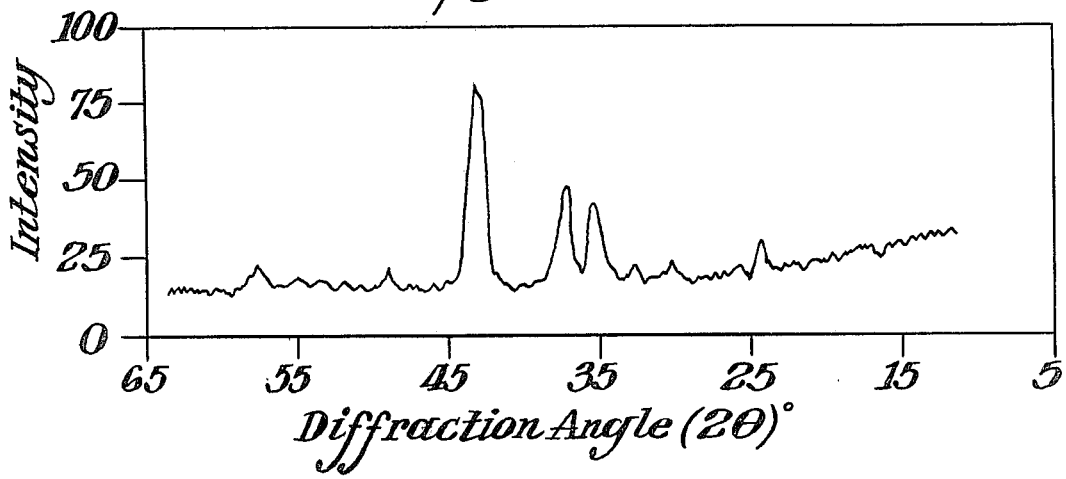
FIG. 5 represents more advanced crystallinity than FIG. 4.

The catalyst compositions according to this invention utilize readily reducible metal oxide catalysts which possess catalytic properties in the oxidized or reduced state, stabilized against the deleterious effects of high temperature and reducing atmospheres by intimate mixture with preselected refractory oxides, thereby permitting heat treatment in the range of about 550° C. to 1000° C. while contacting with a reducing gas in sufficient amount and for a period of time sufficient to cause a substantial inhibition or disruption of crystallite growth as evidenced by x-ray diffraction pattern analysis, concomitantly enhancing catalytic activity.

It is practicable to use one or more metal oxide catalysts in conjunction with one or more refractory oxide stabilizers, thereby enabling better matching of catalysts with stabilizers.

The effects of stabilization according to this invention are verifiable and include the following:

(1) at elevated temperatures in a reducing atmosphere the crystalline structures of the catalyst compositions existing at lower temperatures are altered and become amorphous, or at least much less crystalline, in that characteristic x-ray diffraction patterns disappear, or are sharply altered, in contradiction to teachings of the prior art that crystallinity should increase, (2) catalytic activity is decidedly improved, as evidenced by the obtainment of lowered temperature thresholds of catalytic activity, (3) no fused or glassy phase is developed, and surface areas of the compositions remain relatively high, e.g., typically in excess of 10 m$^2$/gm, and (4) the new catalyst structure has increased thermal stability in a catalytic sense, such that, instead of it being deactivated by exposure to high temperature, it is stable and continues to function at high catalytic levels despite what would ordinarily be considered excessively high and catalytically destructive temperatures.

One methanation catalyst composition according to this invention which was investigated intensively experimentally, as reported in the examples infra, had catalytic activity for the conversion of carbon monoxide in hydrogen to methane at temperatures lower than any catalyst now known or reported in the art.

This methanation catalyst was prepared by coprecipitating nickel and chromium (the catalyst components) from their soluble salts in intimate mixture with individual soluble (stabilizing compounds) cerium, thorium, aluminum, calcium, magnesium, lanthanum and zirconium salts. In the course of preparation, hereinafter detailed in the Examples, the mixture was dried in air at a temperature of 150°±25° C., followed by calcining in air at 300°–500° C., which converted the catalytic component nickel to an easily reducible oxide, whereas the stabilizing components $Cr_2O_3$ and $NiCr_2O_4$ were converted to refractory oxides. The $NiCr_2O_4$ can also be catalytic, so it is dual functioning.

As a specific example, when the nickel-chromium-cerium oxides compositions were heated to 400° C. or 800° C., respectively, in air, the resultant product was highly oriented and crystalline. The methanation catalytic activity was good for the 400° C. sample, and sharply lower, as would be expected from the prior art, for the 800° C. sample. In contrast, however, a sample of this catalyst heated to 800° C. in hydrogen showed, surprisingly a decrease, or at least alteration, in crystallite orientation when subjected to x-ray diffraction analysis. (Refer "X-ray Diffraction Procedures" by H. P. Klug and L. E. Alexander, published by John Wiley & Sons, New York, 1954 or later editions.) Most importantly, when this composition, which had been heated to 800° C. in hydrogen, was tested for methanation catalytic effectiveness, in comparison with identical samples treated in air, and subsequently carefully reduced in $H_2$, at 400° C. for 2 hours, the activity was outstanding, exceeding any known catalysts, including the precious metals, which are known to have the greatest activity at low temperatures. In fact, the threshold of catalytic reaction for Ce, Zr and thorium oxide-stabilized catalysts individually was 140° C., which is at least 50° C. lower than the threshold for any catalyst described in the literature. Moreover, the catalytic thresholds obtained with the other stabilizers tested, while not as low as those reported for Ce, Zr and Th, were, nevertheless, significantly improved over the prior art, e.g., Ca and Mg, each 160° C., lanthanum (La) 170° C. and Al 190° C.

The reasons for the efficacy of this invention are not understood; however, applicants volunteer the following theory, it being understood that they are not to be held to this explanation if future investigation yields additional data requiring revisions of their present understanding.

It is believed that the readily reducible (catalytic) oxides are reduced to nearly elemental metal state by the high temperature $H_2$ treatment except for the retention of small amounts of oxygen which are virtually impossible to remove. On the other hand, the refractory oxide stabilizers probably survive the high temperature reduction as sub-oxides and this smaller entity (refer Example proportions) finds its way into the spinel developing between the nickel and chromium (i.e., nickel chromite), inhibiting crystallite growth and even disrupting crystallites which have already been formed. It is reasoned that, for the stabilizers to be effective, they must be able to lose some oxygen and be non-stoichiometric to at least a very minor degree. It is known that the most effective stabilizers identified supra do behave as described, whereas aluminum oxide and lanthanum oxide are not as easily reduced, even incipiently, when in a condensed crystal phase.

On the basis of the foregoing, this invention has broad application to many, if not all, catalytic metals when mixed with preselected difficulty reducible oxide stabilizers and thereafter exposed to preselected reducing atmospheres and preselected elevated temperatures. The catalytic metal reducible oxides must be matched with the refractory or spinel-forming oxide stabilizers, and the heat treatment and reducing atmosphere established for each case. Accordingly, a wide variety of superior catalysts can be formulated for such basic industrial operations as methanation, steam-hydrocarbon reforming, hydrogenation, carbonylation, oxidation (both selective and complete), ammoxidation, dehydrogenation, chlorination, dehydrochlorination, deoxyhalogenation, as well as petroleum catalysts for reforming, hydroreforming, desulfurization, denitrogenation, hydroforming, isomerization and alkylation. In addition, on the basis of the effectiveness of the methanation catalyst hereinbefore described, it is believed that superior catalysts can be developed according to this invention for the manufacture of specific products including, but not limited to, methanol, ammonia and higher alcohol and amines syntheses.

The Examples hereinafter described were devised to ascertain the effects obtained by a reducing atmosphere subjection at elevated temperatures of a typical reducible metal oxide catalyst mixed with a refractory oxide stabilizer, and on the latter mixture to which various individual refractory oxide interspersants were added. As described in U.S. Pat. No. 3,216,954, interspersants function to space the crystallites of catalysts apart by their random distribution among the crystallites. Generally, these interspersants can be any refractory material, the crystallites of which are similar in size to those of the catalyst. The interspersants should have a melting point above 1000° C. and, preferably, above 1,600° C., under which circumstances refractory oxides are particularly suitable.

Interspersants are comparatively inert particles of size comparable to that of the catalyst crystallites; however, they can also possess catalytic properties of their own. In addition, the interspersants can often advantageously function as stabilizers in the catalyst, refractory oxide stabilizer mixture, so that tests of the associated catalyst, stabilizer compositions with added interspersant are necessary to determine if the overall combinations function according to this invention.

The Examples reveal that, while individual interspersants apparently have some different effects on the catalytic thresholds obtained, in the main the principal advantages of this invention are realized with all of the wide variety of interspersants tested.

EXAMPLE 1

A. 50 parts by weight of chromic acid anhydride ($CrO_3$) were mixed with 140 parts by weight of nickel nitrate hexahydrate [$Ni(NO_3)_2.6H_2O$] in 1000 parts by weight of distilled water adjusted to 30° C.

B. With the solution of A at 30° C., ammonium hydroxide (28% $NH_3$) was added under rapid agitation over a period of 30 minutes and until a 6.8±0.1 pH was reached. Simultaneously, with the addition of the ammonium hydroxide, carbon dioxide was bubbled in at a rate of at least one liter per minute through the solution during precipitation and also during the digestion stipulated in step C infra. This precipitation resulted in the formation of a complex comprising basic nickel ammonium chromate and basic nickel carbonate as an ill-defined precipitate containing nickel, chromium, hydroxyl, amine and carbonate components.

(If desired, the precipitation can be effected with a 10 to 20% solution of ammonium carbonate or bicarbonate instead of the ammonium hydroxide and carbon dioxide treatment supra if more convenient.)

C. The slurry of B was heated to 50° C. and maintained under agitation for a period of one hour.

D. Promptly after the digestion period of C, the slurry obtained was filtered on a Büchner funnel and the filter cake washed with a volume of distilled water equivalent to 2000 parts by weight.

E. The filter cake from D was removed and dried at 150°±25° C.

F. The product of E was calcined in small individual portions weighing approximately 10 gms each under the following conditions:

Sample 1-1: 2 hours in air at 400° C.
Sample 1-2: 2 hours in air at 600° C.
Sample 1-3: 2 hours in air at 800° C.
Sample 1-4: 2 hours in air at 950° C.
Sample 1-5: 2 hours in air at 400° C. followed by 2 hours in $H_2$ at 800° C.

The results obtained are evaluated as set out in Tables I and II infra.

EXAMPLE 2

This Example was performed according to the procedures of Example 1, except that 50.5 parts by weight of lanthanum nitrate hexahydrate $[La(NO_3)_3.6H_2O]$ was added to the paragraph A solution of Example 1. All other operations were the same as for Example 1. The several samples denoted 2-1 to 2-5, inclusive, were given the corresponding treatments for samples 1-1 to 1-5, respectively.

EXAMPLE 3

This Example was performed according to the procedures of Example 1, escept that 47.9 parts by weight of cerium nitrate hexahydrate $[Ce(NO_3)_3.6H_2O]$ was added to the paragraph A solution of Example 1. All other operations were the same as for Example 1. The several samples denoted 3-1 to 3-5, inclusive, were given the corresponding treatments for samples 1-1 to 1-5, respectively.

The catalyst of Example 3 is a preferred embodiment of this invention.

EXAMPLE 4

This Example was performed according to the procedures of Example 1, except that 38.4 parts by weight of zirconium nitrate assaying 20% $ZrO_2$ was added to the paragraph A solution of Example 1. All other operations were the same as for Example 1. The several samples denoted 4-1 to 4-5, inclusive, were given the corresponding treatments for samples 1-1 to 1-5, respectively.

The catalyst of Example 4 is a preferred embodiment of this invention.

EXAMPLE 5

This Example was performed according to the procedures of Example 1, except that 19 parts by weight of CaO dissolved in nitric acid to produce calcium nitrate was added to the paragraph A solution of Example 1. All other operations were the same as for Example 1. The several samples denoted 5-1 to 5-5, inclusive, were given the corresponding treatments for samples 1-1 to 1-5, respectively.

The catalyst of Example 5 is a preferred embodiment of this invention.

EXAMPLE 6

This Example was performed according to the procedure of Example 1, except that 19 parts by weight of magnesium oxide dissolved in nitric acid to produce magnesium nitrate was added to the paragraph A solution of Example 1. All other operations were the same as for Example 1. The several samples denoted 6-1 to 6-5, inclusive, were given the corresponding treatments for samples 1-1 to 1-5, respectively.

The catalyst of Example 6 is a preferred embodiment of this invention.

EXAMPLE 7

This Example was performed according to the procedure of Example 1, except that 19 parts by weight of thorium oxide ($ThO_2$) was added as the equivalent thorium nitrate nonahydrate $[Th(NO_3)_4.9H_2O]$ to the paragraph A solution of Example 1. All other operations were the same as for Example 1. The several samples denoted 7-1 to 7-5, inclusive, were given the corresponding treatments for samples 1-1 to 1-5, respectively.

The catalyst of Example 7 is an especially preferred embodiment of this invention.

EXAMPLE 8

This Example was performed according to the procedure of Example 1, except that 19 parts by weight of $Al_2O_3$ as equivalent aluminum nitrate nonahydrate was added to the paragraph A solution of Example 1. All other operations were the same as for Example 1. The several examples denoted 8-1 to 8-5, inclusive, were given the corresponding treatments for samples 1-1 to 1-5, respectively.

X-ray Diffraction Pattern Determination

The products obtained as a result of the calcinations stipulated in Example 1, paragraph F, for Examples 1–8, inclusive, were examined for x-ray diffraction patterns by comparison with FIGS. 1–6, with the following results:

TABLE I

| | Temperature of Treatment and Classification of Patterns for Individual Stabilizers (and Interspersants) | | | |
|---|---|---|---|---|
| Product from | Air | | $H_2^+$ | |
| Example No. | 400° C. | 800° C. | 800° C. | |
| 1 | IC | SP | SP Altered | $Cr_2O_3$(stablilizer) |
| 2 | IC | SP | MP | $La_2O_3$(interspersant) |
| 3 | D | WDC | IC | $CeO_2$(interspersant) |
| 4 | D | SC | SC | $ZrO_2$(interspersant) |
| 5 | IC | MP | MP Altered | CaO(interspersant) |
| 6 | IC | SP | WDC | MgO(interspersant) |
| 7 | D | WDC | IC | $ThO_2$(interspersant) |
| 8 | D | IC | IC | $Al_2O_3$(interspersant) |

Figure 6:
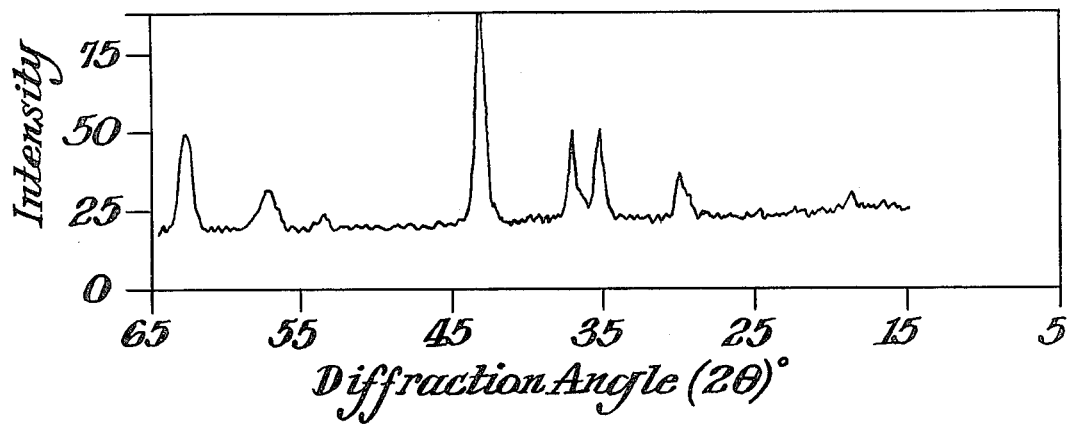
FIG. 6 represents the well-developed easily identifiable sharp peak condition at which crystallite size is measurable.

Note:
The abbreviations supra are defined as follows:
D = diffuse pattern, i.e., little or no crystallinity (FIG. 1)
IC = very little development of crystallinity, i.e., incipient crystallization (FIG. 2)
SC = some identifiable peaks of crystallinity (FIG. 3)
WDC = well-developed short peaks of crystallinity (FIG. 4)
MP = peaks intermediate between WDC and SP (FIG. 5)
SP = sharp peaks, easily identifiable, crystallite size measurable (FIG. 6)

Evaluation of Catalytic Activity

The samples of catalyst prepared according to Examples 1 through 8 inclusive were evaluated for catalytic activity by exposing the samples individually to a flow of a gas mixture analyzing 97% $H_2$ and 3% CO. The catalyst was firmly packed in the center section of a horizontal glass tube measuring ½" diameter by 18" long. The same quantity of catalyst was used in each test.

The tube was fitted so that the gas mixture entered at one end and exited at the other. An axially movable thermocouple well with emplaced thermocouple was mounted coaxially within the tube so that the catalyst temperature and exit gas temperature could each be sequentially measured adjacent to and directly downstream of the catalyst bed.

The catalysts were all (except those previously given the 800° F. $H_2$ treatment) reduced at 400° C. by first passing a 1% $H_2$, 99% $N_2$ mixture through the catalyst until no moisture could be detected in the off gas, indicating completion of reduction at that hydrogen concentration. The $H_2$ concentration was then increased stepwise to 2, 5, 10, 25 and 100% in sequence as soon as the brief reductions were completed at each concentration. Moisture in the off gas was detected by passing the gas through the U tube immersed in a methanol-ice mixture at 20° C. or colder. It is, of course, necessary to use $H_2$ and $N_2$ which are oxygen-free, or to pre-react any oxygen impurities with hydrogen and then desiccate the gas before it is introduced into the reduction tube.

After the reduction, the tubes and furnace were cooled to room temperature for the activity test which was conducted as follows.

The tubes, within furnaces, were initially at room temperature but this was increased at the rate of 3° C. per minute. A second thermocouple was mounted on the outside of each tube so as to measure furnace temperature.

When no reaction was taking place between the $H_2$ and the CO, the catalyst temperature and the tube exit temperature were within 5° C. of each other. However, when the temperature rose to where reaction was occurring, the furnace temperature outside the tube would be 50° C. to 100° C. lower than the internal catalyst temperature as well as the exit gas temperature. Further evidence of the reaction was the collection of water condensate in the downstream and unheated portion of the tube through which the gas was flowing. The reacted gas was also routed periodically through a gas chromatograph analyzer, analyzing the off gas for CO and $CH_4$. When the catalyst was reacting well, there would be only $H_2$ and $CH_4$ (and no CO) in the off gas.

The catalytic activity results are set out in Table II as follows, wherein $O_x$ indicates an oxygen content of somewhat indefinite proportions depending, as it does, on the extent to which oxidation or reduction of the specific refractory oxide stabilizers or interspersants occurs for the individual metal oxides involved.

TABLE II

| Catalyst Identity Example Number | Composition | Atmosphere and Temperature of Heat Treatment | Threshold of Reaction °C. (lowest is best) |
|---|---|---|---|
| 1 | Ni, Cr, $O_x$ | 400° C. air + 400° C. $H_2$ reduction | 250 |
| 1 | | 800° C. air + 400° C. $H_2$ reduction | 250 |
| 1 | | 800° C. $H_2$ | 150 |
| 2 | Ni, Cr, La, $O_x$ | 400° C. air + 400° C. $H_2$ reduction | 300 |
| 2 | | 800° C. air + 400° C. $H_2$ reduction | 260 |
| 2 | | 800° C. $H_2$ | 170 |
| 3 | Ni, Cr, Ce, $O_x$ | 400° C. air + 400° C. $H_2$ reduction | 250 |
| 3 | | 800° C. air + 400° C. $H_2$ reduction | 210 |
| 3 | | 800° C. $H_2$ | 140 |
| 4 | Ni, Cr, Zr, $O_x$ | 400° C. air + 400° C. $H_2$ reduction | 200 |
| 4 | | 800° C. air + 400° C. $H_2$ reduction | 195 |

TABLE II-continued

| Catalyst Identity Example Number | Composition | Atmosphere and Temperature of Heat Treatment | Threshold of Reaction °C. (lowest is best) |
|---|---|---|---|
| 4 | | 800° C. $H_2$ | 140 |
| 5 | Ni, Cr, Ca, $O_x$ | 400° C. air + 400° C. $H_2$ reduction | 250 |
| 5 | | 800° C. air + 400° C. $H_2$ reduction | 320 |
| 5 | | 800° C. $H_2$ | 160 |
| 6 | Ni, Cr, Mg, $O_x$ | 400° C. air + 400° C. $H_2$ reduction | 200 |
| 6 | | 800° C. air + 400° C. $H_2$ reduction | 200 |
| 6 | | 800° C. $H_2$ | 160 |
| 7 | Ni, Cr, Th, $O_x$ | 400° C. air + 400° C. $H_2$ reduction | 250 |
| 7 | | 800° C. air + 400° C. $H_2$ reduction | 200 |
| 7 | | 800° C. $H_2$ | 140 |
| 8 | Ni, Cr, Al, $O_x$ | 400° C. air + 400° C. $H_2$ reduction | 200 |
| 8 | | 800° C. air + 400° C. $H_2$ reduction | 200 |
| 8 | | 800° C. $H_2$ | 190 |

The foregoing shows that in all cases the activity is increased by the high temperature treatment in hydrogen and is sometimes, but not always, increased by high temperature treatment in air. The only consistent treatment is the high temperature treatment in $H_2$.

Reducible oxides which can be employed in the catalyst compositions of this invention include one or more of the oxides of thallium, tin, vanadium, antimony, bismuth, ruthenium, rhodium, palladium, platinum, iridium, osmium, silver, tungsten, cadmium, zinc, cerium, chromium, cobalt, copper, gadolinium, indium, iron, lead, manganese, molybdenum and nickel.

Refractory oxides which are suitable for use with the reducible oxides supra include one or more of the oxides of aluminum, barium, beryllium, boron, calcium, gallium, silicon, titanium, hafnium, niobium, tantalum, uranium, chromium, indium, lanthanum, cerium and the remaining rare earths, magnesium, strontium, thorium, zinc and zirconium.

Reducing gases which can be used depend upon the specific reducible oxide-refractory oxide matches employed. Hydrogen is generally preferred; however, in those situations where carbon is permissible, the reducing atmosphere can be supplied by methane and its homologues, alcohol or other oxygenated product vapors, carbon monoxide, mixed carbon monoxide and hydrogen, and gases produced by the partial oxidation of a hydrocarbon to give substantial amounts of $H_2$, CO, $CO_2$ and water vapor. Also, $NH_3$ is a suitable reductant, subject, of course, to its propensity to dissociate in the presence of some metal catalysts.

The quantity and choice of specific reducing gas required for the reduction step of this invention depends upon a number of factors. Thus, specific reducing gases can be particularly advantageous with specific metals. Additional factors are the temperature of the reduction and the presence of other gases in the reducing gas.

The following reductions illustrate some of the foregoing factors:

$CuO + H_2 \rightarrow Cu + H_2O_{vapor}$
$CuO + CO \rightarrow Cu + CO_2$
$NiO + H_2 \rightleftarrows Ni + H_2O_{vapor}$
$NiO + CO \rightleftarrows Ni + CO_2$

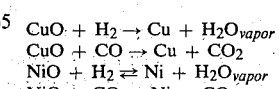
(at elevated temperature these reactions can go in either direction)

As shown supra, carbon monoxide can usually be relied on to reduce oxides almost on a stoichiometric basis subject, however, to the fact that, above about 700° C., $CO_2$ can itself become an oxidizing agent, so that the reaction can be represented as going in both directions. This is also true for the NiO, $H_2$ reaction. In fact, in the NiO+$H_2$ case, and particularly the FeO or $Fe_2O_3$ reaction with $H_2$, there is a strong tendency to move from, for example, Fe+$H_2O_{vapor}$→FeO+$H_2$. Thus, the quantity of reducing gas utilized must be much more than stoichiometric for the latter case, because some of the reducing gas must be used to sweep away the water vapor from the reducing environment, thereby favoring continuation of the reduction. Under these circumstances, the quantity of reducing gas needed can be five or even ten times stoichiometric to ensure that water vapor or $CO_2$ are continuously swept from the reaction zone.

Catalyst preparation by co-precipitation from the water soluble salts is particularly preferred; however, preparation can alternatively be by simple mixing and calcination of the preselected reducible and refractory oxides. Intimate mixing of dry or moist salts can also be practiced. If the latter method is followed, and the salts have a reducing anion, e.g., acetate, oxalate, etc., the calcining operation must first be in an oxidizing atmosphere at 300° C. to 500° C., preferably about 400° C., to ensure development of the oxide state before the high temperature exposure to the reducing atmosphere.

In the Examples, the refractory metals were supplied as the nitrate salts; however, in some instances it can be advantageous to introduce them as the sulfates, chlorides, acetates, formates or other water soluble salts.

Calcination can be conducted in air, or in atmospheres containing preselected percentages of oxygen, or, in some instances, in inert atmospheres if this is desirable in the circumstances.

Catalysts can be utilized in granular form or molded into pellets using commercial extruders or pelleting machines. If desired, the catalysts can be fabricated as microspheres by spray drying, so that they can be employed in fluidized beds. Moreover, the catalyst can be supported on wires, or tubing (with internal heating or cooling), fabricated from either metals or ceramics, or on ceramic fibers or honeycomb. For certain very low temperature operations, the catalysts can be supported on ion exchange resins or diaphragms and, for reactions conducted in non-oxidizing environments, activated carbon or coke can be used for support.

The reduction temperature employed in catalyst preparation according to this invention depends on the nature of the specific refractory oxides employed. Thus, if very refractory oxides such as magnesia, lanthana, chromia and zirconia are utilized, the reduction temperature and atmosphere can be as high as 800° C., or even, in extreme conditions, to 1000° C. Conversely, if the oxides are less refractory and are mobile at relatively low temperatures, reduction can be conducted at temperatures as low as 500° C. Such less refractory oxides include those of the metals molybdenum, tungsten, phosphorus (as phosphates), antimony, arsenic and vanadium. It should be pointed out, in caution, that some metals or metalloids form volatile hydrides which must be avoided or minimized to prevent deactivation of the catalyst by stripping of an active component. The safest course is to ascertain the appropriate reduction temperature for each catalyst and application; it being understood that, generally, temperatures in the range of from 500° C. to 1000° C. are effective, with the preferred temperatures, in most cases, being mid-range, i.e., 750°±50° C.

It will be understood that "refractory oxides", as the term is used herein, include the sub- or per-oxides and all stoichiometric as well as non-stoichiometric states of the oxides. The refractory oxides can be added singly, or in mixtures, or even in groups. They can be non-reactive among themselves, or they can be interreacting, such as magnesium oxide and aluminum oxide to form a spinel. Other refractory oxides can include yet other pseudo or normal crystalline forms, so that this invention is not limited to spinels. In fact, it is believed that other catalyst forms can include those which normally exist in the perovskite, wurtzite, inverse spinels, ilmenite, phenacite, scheelite and other "model" crystalline designations.

As regards the Example compositions, nickel and chromium oxides, particularly when prepared as described supra, form a nickel chromite spinel. This is one representative of a group of catalytic chromites including those of the metals copper, zinc, cobalt, iron, cadmium and others less inclined to form chromites but which do tend to form crystalline species with refractory oxides.

It is our belief that partial reduction of the refractory oxide (or sub-oxide) to a lower state of oxidation forms a smaller ion which intrudes into the catalytic species to break down crystallinity already formed, as well as prevent further crystallization.

Because crystallinity is inhibited, or even disrupted, catalyst compositions according to this invention apparently exist as new structures of matter. Accordingly, it is anticipated that their catalytic effectiveness will not be as easily adversely affected by poisons such as sulfur, halides, phosphine, stibine, arsine and the like, because the intimate associations of the catalyst ingredients will prevent poisons making their way to active sites already occupied by the foreign ions herein intentionally added to the compositions. These foreign ions in turn are unique, because they have been developed by the unique high temperature reductive treatment which also stimulates molecular movement to sites where they intrude into and prevent further development of crystallinity of the matrix as well as the catalytic material.

Insofar as our present research has indicated, the catalysts of this invention will function well under the usual pressures at which conventional catalysts are employed.

What is claimed is:

1. A catalyst composition comprising an intimate mixture of at least two metal oxides one of which is reducible to either a sub-oxide or substantially to the elemental metal state whereas the other is a refractory oxide which is substantially non-reducible, which mixture has been exposed to a reducing gas in sufficient quantity and at a temperature in the range of 550° C. to 1000° C. to cause a substantial inhibition or disruption of crystallite growth as evidenced by x-ray diffraction pattern analysis, concomitantly enhancing catalytic activity.

2. A catalyst composition according to claim 1 in which said reducible oxide is that of a metal or metals of the group consisting of thallium, tin, vanadium, antimony, bismuth, ruthenium, rhodium, palladium, platinum, iridium, osmium, silver, tungsten, cadmium, zinc, cerium, chromium, cobalt, copper, gadolinium, indium, iron, lead, manganese, molybdenum and nickel.

3. A catalyst composition according to claim 1 in which said refractory oxide is that of a metal or metals of the group consisting of aluminum, barium, beryllium, boron, calcium, gallium, silicon, titanium, hafnium, niobium, tantalum, uranium, chromium, indium, lanthanum, cerium and the remaining rare earths, magnesium, strontium, thorium, zinc and zirconium.

4. A catalyst composition according to claim 1 in which said reducible oxide consists of nickel oxide either alone or in intimate mixture with chromium oxide, plus at least one refractory oxide of the group consisting of magnesium, lanthanum, cerium, zirconium, calcium, thorium and aluminum.

5. A catalyst composition according to claim 1 in which said reducing gas is hydrogen.

6. A catalyst composition according to claim 1 in which said reducing gas is carbon monoxide, either alone or in mixture with hydrogen.

7. A catalyst composition according to claim 1 mounted on a refractory support.

8. A method for the manufacture of a catalyst composition comprising, in the following sequence:
  (a) co-precipitating a salt of a reducible metal having catalytic properties together with a salt of a metal capable of forming a refractory oxide,
  (b) calcining the co-precipitate of step (a) in an oxygen-containing atmosphere at a temperature above about 300° C. for a period of time sufficient to produce a reducible metal oxide in mixture with a refractory metal oxide, and
  (c) heating the metal oxide mixture of step (b) in contact with a reducing gas at a temperature in the range of 550° C. to 1000° C. for a time sufficient to cause a substantial inhibition or disruption of crystallite growth as evidenced by X-ray diffraction pattern analysis concomitantly enhancing catalytic activity.

* * * * *